United States Patent [19]
Ward

[11] Patent Number: 5,622,458
[45] Date of Patent: Apr. 22, 1997

[54] AIR LIFT PUMP FOR WET PARTICULATES

[75] Inventor: Stephen D. Ward, Lewisburg, Pa.

[73] Assignee: Andritz Sprout-Bauer, Inc., Muncy, Pa.

[21] Appl. No.: 278,508

[22] Filed: Jul. 21, 1994

Related U.S. Application Data

[63] Continuation-in-part of Ser. No. 138,395, Oct. 18, 1993, abandoned, which is a continuation-in-part of Ser. No. 913,290, Jul. 14, 1992, Pat. No. 5,277,829.

[51] Int. Cl.$^6$ ............................................. B65G 53/52
[52] U.S. Cl. .......................... 406/194; 406/93; 406/108; 406/141
[58] Field of Search ........................... 406/93, 94, 95, 406/108, 122, 141, 142, 143, 153, 191, 194

[56] References Cited

U.S. PATENT DOCUMENTS

| | | | |
|---|---|---|---|
| 1,152,302 | 8/1915 | Davenport | 406/194 X |
| 2,421,840 | 6/1947 | Lechthaler et al. | 209/138 |
| 3,887,337 | 6/1975 | Descamps et al. | 422/143 |
| 4,002,325 | 1/1977 | Herfeld | 366/101 |
| 4,126,546 | 11/1978 | Hjelmnér et al. | 210/741 |
| 4,776,731 | 10/1988 | Briggs et al. | 406/194 X |
| 5,173,194 | 12/1992 | Hering, Jr. | 210/792 |

FOREIGN PATENT DOCUMENTS

| | | | |
|---|---|---|---|
| 3-8622 | 1/1991 | Japan | 406/194 |
| 1650534 | 5/1991 | U.S.S.R. | 406/194 |

OTHER PUBLICATIONS

DynaSand® Filter, Parkson Corporation, 1980 brochure.

*Primary Examiner*—Andrew C. Pike
*Attorney, Agent, or Firm*—Chilton, Alix & Van Kirk

[57] ABSTRACT

An air lift pump for wet particulates has a plurality of transport tubes and air injectors disposed in a central column for transporting particulate matter from a lower elevation to a higher elevation. The central column has a closed top and an open bottom. Each tube has a lower, intake end and first and second air injectors comprised of a housing disposed around an air injection section of the transport tube in which is mounted a first or second air jet, respectively. Each air jet may be composed of either a plurality of circular ring members or a coiled member. The ring members and the coiled member have a substantially triangular-shaped cross section wherein the base of the triangle defines the exterior surface of the air jet. The ring members and coiled member form a plurality of circular slots or a coiled slot, respectively, having substantially trapezoid-shaped cross sections. The trapezoid cross section of the slots acts as a diffuser, causing the flow of compressed air to expand and to increase velocity. The lower portion of the second air injector housing comprises a third air jet which may be composed of either circular ring members or a coiled member similar to the first and second air jets.

11 Claims, 4 Drawing Sheets

AIR LIFT PUMP FOR WET PARTICULATES

This is a continuation-in-part of application Ser. No. 08/138,395, filed Oct. 18, 1993, now abandoned, which is a continuation-in-part of Ser. No. 07/913,290 filed Jul. 14, 1992, now U.S. Pat. No. 5,277,829.

BACKGROUND OF THE INVENTION

The present invention relates to air lift pumps, particularly air lift pumps for transporting wet particulate matter from a lower level to an upper level.

U.S. Pat. Nos. 5,173,194 and 4,126,546 disclose deep bed filter units having a central air lift pump for transporting dirty filter media from a bottom region of the filter to a top region of the filter. Both patents disclose a coaxial pipe arrangement wherein air is forced down a first pipe ('194 down the center pipe, '546 down the outer pipe) and is discharged into the second pipe. The rising air provides the motive force to lift dirty filter medium up the second pipe ('194 up the outer pipe, '546 up the inner pipe). These designs therefore utilize a single media transport pipe and a single point of air injection.

As the size of such units is increased, the diameter of the airlift media transport pipe must be increased. Large diameter media transport pipes require an excessive amount of air to provide the proper media flow. Additionally, such large pipes may be more expensive and more difficult to install than smaller diameter pipes.

A single point of air injection may limit the capacity of such filters. The single point must be located sufficiently close to the transport tube intake to draw the dirty media into the tube. As the flow of water, air, and dirty media travels up the transport tube, friction and turbulence reduce the rate of flow. This flow reduction effectively limits the length of the transport tube, thereby limiting the size of the unit.

Such air lift systems spray dirty media and water upwards out of the upper end of the transport tube in an uncontrolled manner. The falling media and water causes splashing when it impacts the top surface of the water contained in the wash chamber. Airborne dirty media and water particles containing impurities may be free to leave the wash chamber contaminating the filtrate. Additionally, the water transported upwards with the dirty media contributes to the volume of dirty water which must be rejected as waste water. Therefore, a significant portion of the influent water (infilt) must be disposed of as waste.

U.S. Pat. No. 5,277,829, which issued on Jan. 11, 1994 to the assignee of the present invention, discloses a deep bed filter unit in which the infilt flows upwardly through a sand bed such that the filtrate accumulates above the sand bed while the dirty sand is continuously regenerated. Dirty filtration media is collected in the lower region of the filter vessel. An air lift pump system is utilized to transport the dirty media from the lower region to wash means located in the upper region of the filter vessel where impurities are washed out of the filter media. The filter utilizes a single air lift pump having two separate air injection points to provide the motive force necessary to transport the dirty filter media. The first air injection point is located in a horizontal section of the transport pipe and establishes an initial flow of the dirty media. The second air injection point is located in a vertical section of the transport pipe and provides scouring of the dirty media and the necessary motive force to transport the dirty media to the wash means.

The use of separate air pumps in a single air pump system requires additional piping, fittings, and diffusers. The additional piping may be comprised of multiple pipe segments or intricately bent pipe to avoid interference with other filter components.

The above filters employ a single air lift pump having a single suction point for the dirty media. Such single suction air lift pumps generally do not uniformly remove dirty media from the filter lower region. It is common for dirty media to be more efficiently removed from some areas and less efficiently removed from other areas. In addition, much of the energy imparted by the second air injection point is required for lifting the dirty media to the wash means thereby limiting the amount of media scouring.

SUMMARY OF THE INVENTION

It is, accordingly, an object of the present invention to provide a new and improved air lift pump system that more efficiently transports wet particulate matter from a lower position to an upper position.

It is a further object of the invention to provide a new and improved air lift pump system that has a transport capacity that may be incremented substantially without limit.

It is another object of the invention to provide a new and improved air lift pump system that deposits the transported particulate matter in a controlled manner, thereby substantially eliminating splashing and airborne particles.

It is yet another object of the invention to provide a new and improved air lift pump system for deep bed filter systems that increases the amount of scouring of the dirty filter media that occurs in the transport tube.

It is finally an object of the invention to provide a new and improved air lift pump system for deep bed filter systems that minimizes the amount of water carried with the transported dirty filter media, thereby reducing the amount of infilt which is rejected as waste water.

An air lift pump system for wet particulates in accordance with the present invention is comprised of air injectors and transport tubes. A plurality of transport tubes are utilized to provide for uniform removal of the particulate material and to allow incremental expansion of the transport capacity. In a preferred embodiment, the transport tubes each have a vertical section disposed in a central column. First and second air injectors located in the transport tube vertical section provide the motive force required to transport the particulate material and an improved scouring action for the particulate material.

Each air injector is comprised of a housing disposed around an air injection section of the transport tube in which is mounted an air jet. The supply line is in fluid communication with the interior of the injector housing. Air is delivered to the transport tubes via an air supply line, the housing, and the air jet. As the compressed air is injected into the transport tube by the first air injector it creates a vacuum at the lower intake end of the transport tube, drawing the particulate matter into the tube and causing it to be transported upwards. The compressed air injected into the transport tube by the second air injector accelerates the upward movement of the particulate matter and performs a scouring action.

In one embodiment, the air jet is comprised of a plurality of circular ring members having a substantially triangular-shaped cross section wherein the base of the triangle defines the exterior surface of the ring member. The ring members form a plurality of circular slots, each having a cross section that is substantially shaped like a trapezoid. As the air is injected through the slots, the trapezoid-shaped cross section of the slots causes the air to expand and increase velocity. The trapezoid-shaped cross section also limits the amount of sand and water that might leak out of the transport tubes via the slots. Additionally, the trapezoid-shaped cross section promotes self-cleaning of the slots by the flow of air.

In a second embodiment, each air jet is comprised of a coiled member composed of wedge wire. The wedge wire has a substantially triangular-shaped cross section, wherein the base of the triangle defines the exterior surface of the coiled member. An air jet constructed in accordance with the second embodiment defines a coil-shaped slot having substantially the same properties as the circular slots of the first embodiment.

In a preferred embodiment, first and second air injectors are utilized. The first air injector is comprised of a housing disposed around a first air injection section of the transport tube in which is mounted a first air jet. The second air injector is comprised of a housing disposed around a second injection section of the transport tube in which is mounted a second air jet. The lower portion of the second air injector housing comprises a third air jet. A branch from the compressed air manifold delivers air into the central column, thereby establishing a super-atmospheric pressure therein. Compressed air flowing from the branch pushes the water contained in the central column downwards until the water level reaches the lower section of the second air injector housing and at least partially uncovers the third air jet. The air flows through the slots defined by the circular members or coiled member. The air then displaces the water between the second air injector housing and the transport tube until the second air jet is at least partially uncovered. Air flows through the slots defined by the second air jet circular members or coiled member and is thereby injected into the transport tube. Using a single central column to supply a plurality of second air injectors provides a balanced flow of air to each air injector.

In a first embodiment the present invention transports dirty filter media from a lower portion of a filter unit to a wash device located in an upper portion of the filter unit. The basic operating principle of the filter unit, is somewhat similar to that described in U.S. Pat. No. 5,277,829. The infilt moves upwardly through the region of filter media, while the filter media moves downwardly, carrying the accumulated dirt therewith, whereupon, at the bottom of the basin, the dirty media is transported to a plurality of media washing devices. Each washing device provides a flow of washing fluid, preferably in countercurrent to the flow of dirty media, such that the dirt is flushed from the media and withdrawn from the filter system as reject flow, while the cleaned media is deposited at the top of the region of filter media. In other words, the filter media is substantially continuously regenerated.

Preferably, a central column extends upwardly along the filter unit axis, thereby defining a column volume. The central column is preferably cylindrical with an open bottom and a closed top. The lower end of the column is spaced from the bottom wall of the filter basin. The dirty filter media is transported through a plurality of tubes extending through the central column. The transport tubes are isolated from the filter media bed as a result of their vertical traverse through the central column. The central column provides sufficient space for any service operations to be performed, without draining the media from the basin. Using a plurality of tubes allows the size of the unit to be increased incrementally such that the unit size is not limited by the dirty media transport capacity.

Each tube has a lower, intake end situated near the bottom wall for drawing dirtied filter media from the side volume in the lower portion of the basin and transporting the drawn media upwardly to a discharge end at an elevation above the filtrate level of the filtrate region. The lower section of the transport tube may be flared outwardly to properly position the intake end and ensure that dirty media is uniformly removed from the lower portion. The upper discharge section travels above the surface level of the filtrate and the discharge end is directed downwards into the washing device. Due to this arrangement, a large portion of the water transported in the transport tubes falls back within the tubes and is not transported to the washing device. Almost all of the reject flow is composed of counterflow water that has travelled through the wash device. Therefore, the design minimizes the amount of infilt that is lost as reject flow. Additionally, directing the discharge downwards towards the wash device reduces the incidence of airborne media and water due to the discharge and splashing caused by the discharge. The upper section of the transport tubes may be composed of transparent material to provide visual indication of dirty media transport. In a preferred embodiment, a minimum of two transport tubes service each wash device ensuring that the transport of dirty media will not be interrupted if one transport tube is out of service.

BRIEF DESCRIPTION OF THE DRAWINGS

These and other objects and advantages of the invention will become more evident from the following description of the preferred embodiments and the accompanying drawings, in which.

DESCRIPTION OF THE PREFERRED EMBODIMENT

With reference to the drawings wherein like numerals represent like parts throughout the several figures, an air lift pump for wet particulates in accordance with the present invention is generally designated with the numeral 10. The air lift pump 10 is comprised of a transport tube 62 and one or more air injectors 80, 94.

Figure 1:
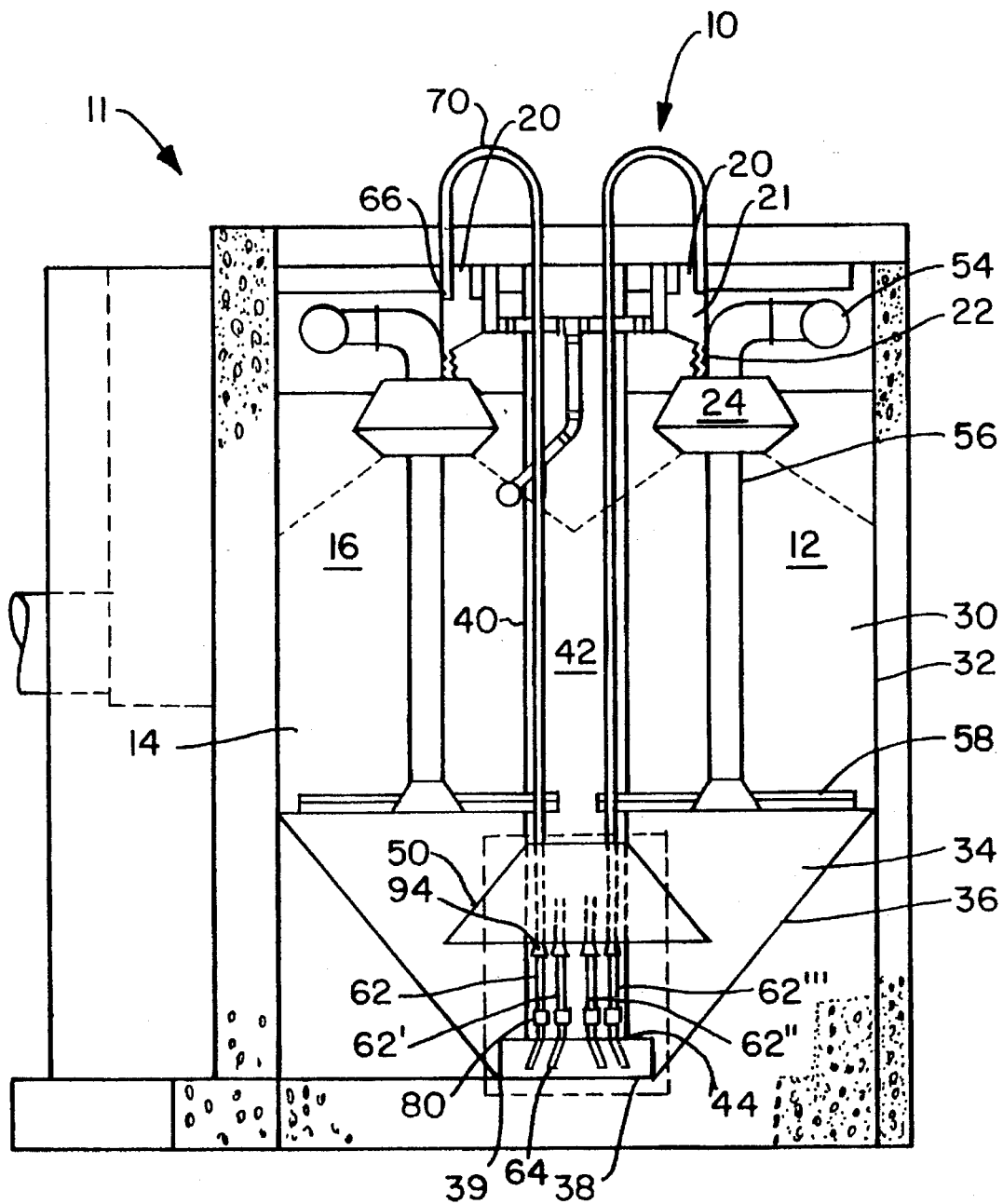
FIG. 1 is an elevation view of a filter system having two filter media beds and two media washing devices and comprising dirty filter media transport apparatus in accordance with the present invention.

With reference to FIG. 1, the air lift pump 10 is preferably employed in a deep bed filter system 11 having two filter media beds 12 and two media washing devices 20 for providing substantially continuous regenerative operation for the secondary treatment of, for example, water in a waste water treatment plant. Each filter system 11 of the type described can be situated side-by-side to form a filter installation.

If viewed in plan, the system 11 of FIG. 1 has a substantially rectangular perimeter. Poured concrete forms a basin which is preferably embedded in a ground excavation, so that most of the vertical extent of the basin is below ground level. The basin has a central vertical axis, an upper portion 30 having vertical perimeter walls 32, a lower portion 34 having a side walls 36 angled obliquely downwardly from the perimeter wall 32 towards the axis, and a bottom wall 38 which closes the side walls 36. A central column 40 extends upwardly along the axis, thereby defining an outer surface that is spaced from the basin walls so as to define a column volume 42 and a side volume 16. The lower end 44 of the column 40 is spaced from the bottom wall 38. A skirt 39 or similar structure may extend from the lower end 44 of the central column 40 toward the bottom wall 38, thereby encapsulating a bottom volume which is in fluid communication with the side volume.

A region 12 of filter media 14, such as sand, fills the side volume in the lower portion of the basin and extends upwardly into the side volume of the upper portion of the basin. The media 14 in the side volume in the lower portion of the basin is in fluid communication with the bottom volume through openings or the like in the skirt. A frusto-conical apron 50 or similar structure is situated in the lower portion of the basin, preferably annularly surrounding the central column 40 and extending obliquely toward the oblique side wall 36, thereby defining an annulus of relatively small cross-sectional area through which media 14 above the apron 50 can flow toward the bottom volume.

An inlet conduit (not shown) receives a substantially continuous flow of liquid to be filtered, i.e., infilt, from a source outside the basin. In the illustrated embodiment, the inlet includes a pipe 54 which receives infilt at the upper portion of the basin, from which it is delivered through two vertical conduits 56 to an elevation above the apron 50, where the infilt is distributed at a plurality of azimuthally spaced locations in the media bed 12. These distribution members 58 can preferably take the form of a plurality of radially extending distribution spokes that are perforated along their radial extension such that infilt can be distributed substantially uniformly in the respective media bed at that elevation. The infilt then flows upwardly through the media 14 in the side volume of the upper portion of the basin and accumulates as a region of flitrate. During this upward flow, the dirt and other solids are trapped in the media 14 such that, upon emerging from the upper surface of the media 14, clean liquid accumulates in the side volume 16 above the media bed 12 in the upper portion of the basin, while the dirt in the infilt remains trapped in the media 14 in the side volume 16.

The basic operating principle of the present invention is somewhat similar to that described in said U.S. Pat. No. 5,277,829, in which the infilt moves upwardly through the region of filter media 14, while the filter media 14 moves downwardly, carrying the accumulated dirt therewith, whereupon, at the bottom of the basin, the dirty media 14 is transported to a media washing device 20. The washing device 20 provides a flow of washing fluid, preferably in countercurrent to the flow of dirty media 14, such that the dirt is flushed from the media 14 and withdrawn from the filter system 11 as reject flow, while the cleaned media 14 is deposited at the top of the region of filter media. In other words, the filter media 14 is substantially continuously regenerated.

Figure 2:
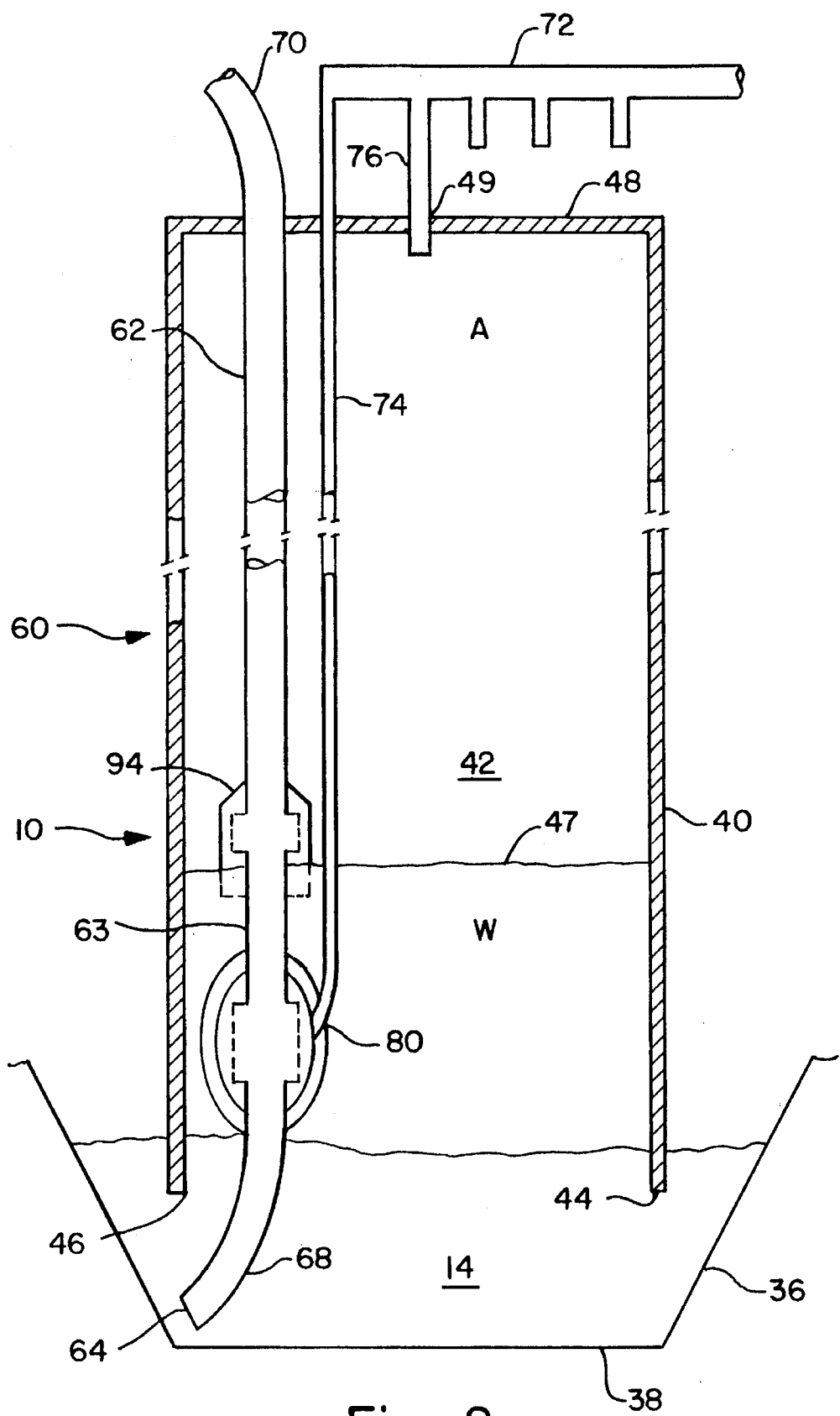
FIG. 2 is an enlarged, fragmentary section view of the transport apparatus of FIG. 1.

In the present invention, the dirty filter media 14 is transported through a plurality of tubes 62 extending through the central column 40. Using a plurality of tubes 62 allows the size of the unit 11 to be increased incrementally such that the unit size is not limited by the dirty media transport capacity. Each tube has a lower, intake end 64 situated near the bottom wall 38 for drawing dirtied filter media 14 from the side volume 16 in the lower portion of the basin and transporting the drawn media 14 upwardly to a discharge end 66 at an elevation above the flitrate level of the filtrate region. The lower intake end 64 of each transport tube 62 may be positioned such that dirty media 14 is uniformly removed from the lower portion 34. Typically the lower section 68 of the transport tube 62 is flared outwardly to properly position the lower intake end 64, as shown in FIG. 2. The upper discharge section 70 travels above the surface level of the filtrate and the discharge end 66 is directed downwards into the washing device 20, as shown in FIG. 1. Due to this arrangement, a large portion of the water transported in the transport tubes 62 falls back within the tubes 62 and is not transported to the washing device 20. Almost all of the reject flow is composed of counterflow water that has travelled through the wash device 20. Therefore, the design minimizes the amount of infilt that is lost as reject flow. Additionally, directing the discharge downwards towards the wash device 20 reduces the incidence of airborne media and water due to the discharge and splashing caused by the discharge. The upper section 70 of the transport tubes 62 may be composed of transparent material to provide visual indication of dirty media 14 transport.

A plurality of washing devices 20 are situated at least partly in the basin, each washing device 20 located in an azimuthally distinct position above the region of filter media 14 and fluidly connected to at least one of the transport tubes 62 such that each tube 62 delivers a substantially continuous flow of dirtied media 14 to only one washing device 20. The washing device 20 contacts the delivered dirtied media 14 with a flow of wash water such that the wash water carries the dirt in the dirty media 14 out of the basin and the clean filter media 14 drops toward the filter media region 12 where a plurality of media distribution devices 24, associated respectively with the plurality of washing devices 20, direct the dropping cleaned media 14 to a respective plurality of locations on the filter media region 12. An outlet line (not shown) in fluid communication with the flitrate region draws a flow of filtrate from the basin.

It can be appreciated by those familiar with this field of technology that the source of infilt can be an elongated trough which runs alongside a plurality of systems 11 situated side-by-side to form a large filter installation. Similarly, another trough can run along the installation for receiving and carrying away the filtrate contributed by each system. The filtrate level in the flitrate region is established by the elevation of weir (not shown) on the inside of the filtrate trough such that, during operation, the filtrate level in the filtrate region is at or above the liquid level in the horizontal run of the inlet conduit.

As is evident in FIG. 1, the two wash devices 20 are preferably situated equidistantly from the central column 40, and preferably situated midway between the column 40 and the perimeter wall 32. The vertical run of each conduit 56, which passes through a media distribution member 24, is therefore also approximately equidistantly spaced from the central column 40 to the perimeter wall 32 in the upper portion of the basin. Below the radial infilt distribution members 58, however, the basin walls 36 taper inwardly to form a natural funnel which, in cooperation with the apron on the central column, limit the downward flow of dirty media 14.

FIG. 1 shows the central column 40 and four transport tubes 62 which are part of an air lift subsystem 60, to be described in detail below. In a preferred embodiment, a minimum of two transport tubes 62 service each wash device 20 ensuring that the transport of dirty media 14 will not be interrupted if one transport tube is out of service. In the embodiment shown in FIG. 1 two of the transport tubes 62, 62' service the first wash device 20 and the other two transport tubes 62", 62''' service the other wash device 20'. Thus, the air lift subsystem services a plurality of wash devices 20 within the same base basin.

Preferably, the transport tubes 62 do not pass through the media region 12, but rather are isolated therefrom as a result of their vertical traverse through the central column 40. The central column 40 provides sufficient space for any service operations to be performed, without draining the media 14 from the basin. The dirty media 14 is deposited into a wash chamber 21, which includes a baffled lower portion 22 which has a substantially zigzag shape. The lower end of the baffled portion 22 enters the upper, covered portion of the media distribution member 24 such that the discrete particles of media 14 fall downwardly through the wash chamber 21, baffles 22, and into the media distribution member 24. The chamber 21, baffle 22, and media distribution member 24 are isolated from the flitrate in the filtrate region above the media region. The media distribution member 24 has an open bottom in contact with the upper surface of the media bed 12. In fact, as cleaned media 14 falls into the media distribution member 24, the media 14 accumulates therein to form a reservoir of clean media 14, to assure that sufficient supply of clean media 14 is available to pass out of the media distribution member 24 to the top of the filter bed 12, without creating a gap between the lower, open end of the media distribution member 24 and the filter media bed 12.

The flow of wash liquid passes upwardly from the filter bed into the media distribution member 24, and upwardly through the baffle portion 22 of the wash device 20 where the dirt experiences a counterflow which carries the dirt upwardly and out through the reject conduit. Because the level of filtrate in the flitrate region is above the level at a which the reject flow passes out of the wash device, there is a net hydraulic pressure differential which maintains the flow of flitrate from the filter bed directly into the open lower end of the media distribution member 24.

Referring to FIGS. 1 and 2, the central column 40 is preferably cylindrical with an open bottom 46 and a closed top 48, except for the sealed penetrations 49 associated with the transport tubes 62 and air supplies 74, 76. The air lift subsystem 60 provides a plurality of air lift tubes 62, as mentioned above, with each tube 62 having a lower intake end 64 that is at or slightly spaced from the bottom wall 38 in the bottom volume of the basin, and an opposite discharge end 66 which discharges into one wash device 20. A typical transport tube would have an ID of about 1.25 inch (3.5 cm).

Figure 4:
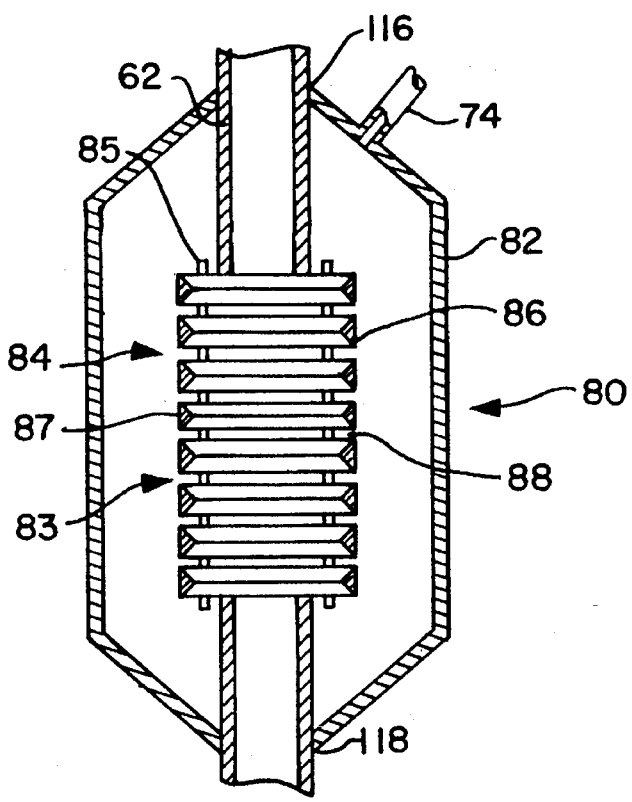
FIG. 4 is an enlarged section view of the first air injector of FIG. 2.

All of the transport tubes 62 are supplied from a common source of compressed air, such as the manifold 72 shown in FIG. 2, via an individual supply line 74. Each supply line 74 extends downwardly through the top member 48 of the central column 40 to a first air injector 80 positioned near the bottom open end 44 of the column 40. The supply lines 74 are preferably composed of pipe having an ID of about 0.25 inch (0.6 cm), with air introduced into the first air injector 80 at a pressure of about 20 psi (140 kpa). Each first air injector 80 is comprised of a housing 82 disposed around a first air injection section 84 of the transport tube 62 in which is mounted a first air jet 83, as shown in FIG. 4. The housing 82 is joined at its upper and lower ends 116, 118 to the transport tube 62 to define a closed volume. The supply line 74 is in fluid communication with the interior of the injector housing 82.

Air is delivered to the transport tubes 62 via the first air jet 83. In one embodiment, shown in FIG. 4, the first air jet 83 is comprised of a plurality of circular ring members 86. The ring members 86 are connected by a plurality of structural members 85, or similar device, to form the air jet 83. Each circular ring member 86 has a substantially triangular-shaped cross section wherein the base of the triangle defines the exterior surface 87 of the ring member 86. The ring members 86 are axially spaced to form a plurality of circular slots 88 having substantially trapezoid-shaped cross sections. The trapezoid-shaped cross section causes the slots 88 to act as annular diffusers. As the air is injected through the slots 88, the trapezoid-shaped cross section of the slots 88 causes the air to expand and to increase velocity. The trapezoid-shaped cross section also limits the amount of sand and water that might leak out of the transport tubes 62 via the slots 88. Additionally, the trapezoid-shaped cross section promotes self-cleaning of the slots 88 by the flow of air.

Figure 6:
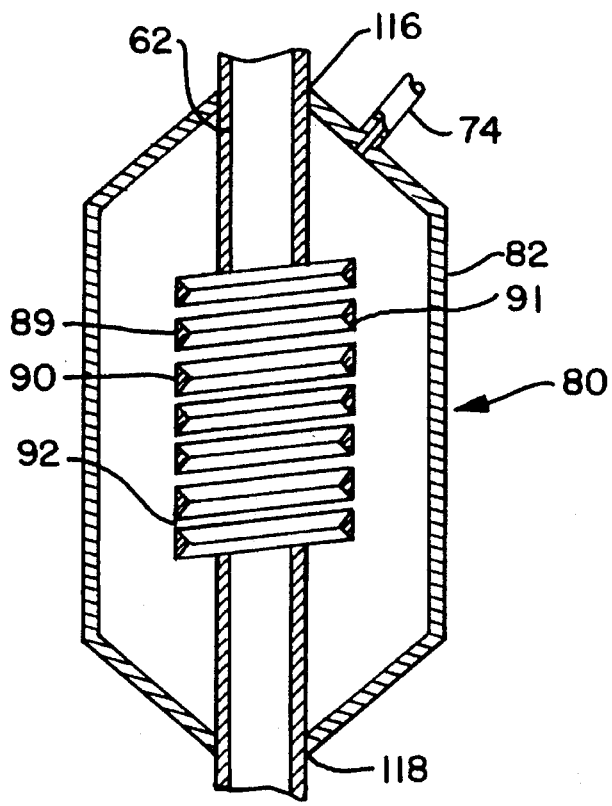
FIG. 6 is an enlarged section view of an alternate embodiment of the first air injector of FIG. 2.

In a second embodiment shown in FIG. 6, each first air jet 89 is comprised of a coiled member 90 composed of wedge wire. The wedge wire has a substantially triangular-shaped cross section, wherein the base of the triangle defines the exterior surface 91 of the coiled member 90. An air jet 89 constructed in accordance with the second embodiment defines a coil-shaped slot 92 having substantially the same properties as the circular slots 88 of the first embodiment. As the compressed air is injected into the transport tube 62 it creates a vacuum at the lower intake end 64 of the transport tube 62, drawing the dirty media slurry into the tube.

It is expected that, due to the slurry-like consistency of the dirty media 14 at the lower portion of the basin, some water will separate from the slurry and rise in the central column 40. To prevent this water level from rising excessively, a branch 76 from the compressed air manifold 72 delivers air into the column 40, thereby establishing a volume of air A having a super-atmospheric pressure therein, which can be regulated to maintain the water W at a desired level 47. The first air injector 80 for each transport tube 62 is preferably below the water level 47 in the column 40.

Figure 3:
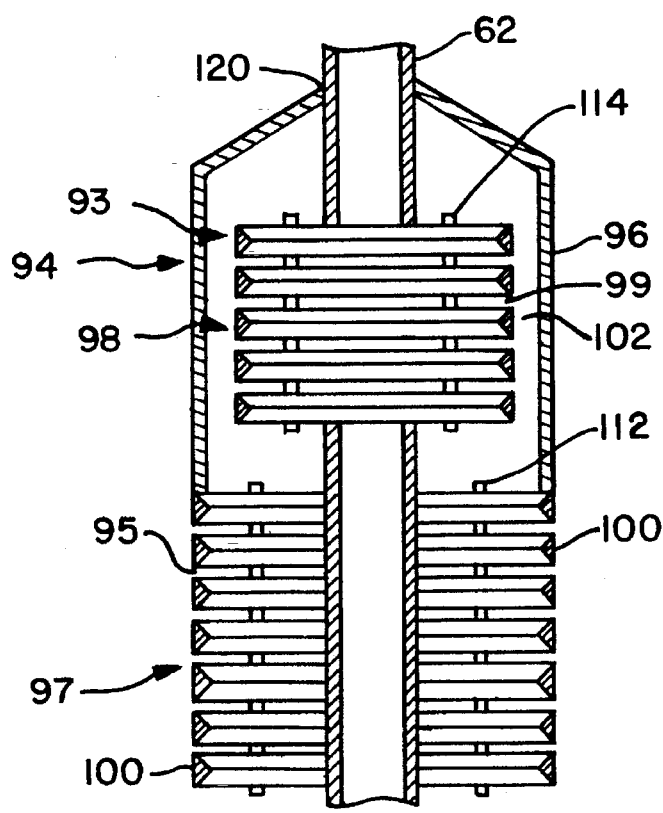
FIG. 3 is an enlarged section view of the second air injector of FIG. 2.
Figure 5:
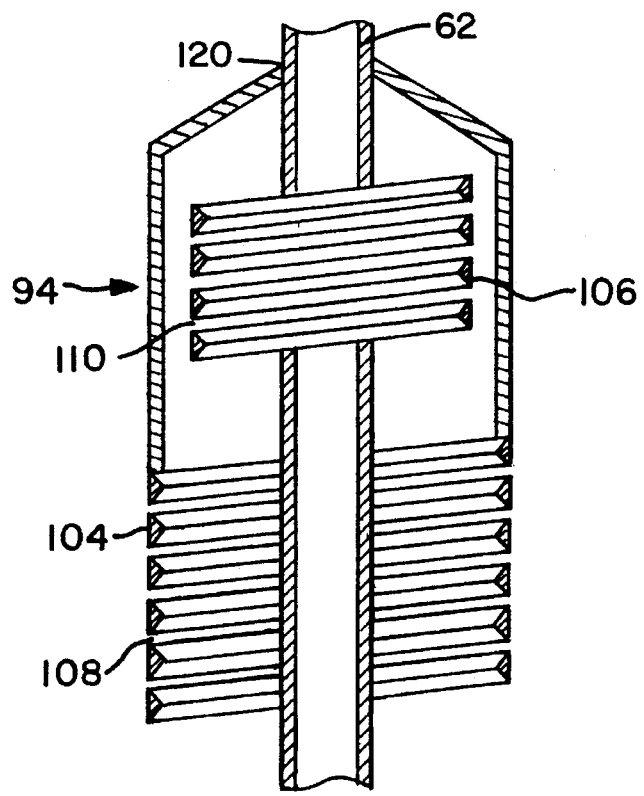
FIG. 5 is an enlarged section view of an alternate embodiment of the second air injector of FIG. 2.

In a preferred embodiment, the upflow of air in the tubes 62 is augmented by providing a second air injector 94. As shown in FIG. 3, the second air injector 94 is comprised of a housing 96 disposed around a second injection section 98 of the transport tube 62 and a second air jet 93, as shown in FIG. 3. The upper end 120 of the housing 96 is joined to the transport tube 62. The lower portion of the second air injector housing 96 comprises a third air jet 97. The third and second air jets 97, 93 may be composed of circular ring members 100, 102 connected by a plurality of structural members 112, 114 (FIG. 3) or a coiled member 104, 106 (FIG. 5) similar to first air jet 89. The transport tube 62 is in fluid communication with the branch 76 from the compressed air manifold 72 via the central column 40 and the second and third air jets 93, 97. Compressed air flowing from the branch 76 pushes the water contained in the central column 40 downwards until the water level 47 reaches the lower section of the second air injector housing 96 and at least partially uncovers the third air jet 97, as shown in FIG. 2. The air flows through the slots 95, 108 defined by the circular members 100 or coiled member 104. The air then displaces the water between the second air injector housing 96 and the transport tube 62 until the second air jet 93 is at least partially uncovered. Air flows through the slots 99, 110 defined by the circular members 102 or coiled member 106 and is thereby injected into the transport tube 62. The water level 47 effectively seals the lower end of the housing 96, thereby defining a closed volume, and the slots 95, 108 act as inlet ports for the pressurized air. Using a single central column 40 to supply a plurality of air injectors 94 provides a balanced flow of air to each air injector. The air pressure in the central column 40, which induces the flow of secondary air, is preferably maintained at about 15 psi (100 kpa).

Positioning both the first and second air injectors 80, 94 in a vertical section 63 of the transport tube 62 increases the amount of injected air that is available for scouring the dirty media 14 in the transport tube 62. Therefore, a larger portion of the dirt is flushed from the media 14 prior to its delivery to the wash chamber 21. This increases the efficiency of the regeneration process.

It should be appreciated that the inventive features described herein can readily be incorporated into a deep bed filter system 11 that is not constructed from a poured concrete basin, but rather has the form of an aboveground, upright vessel, such as shown in U.S. Pat. No. 5,277,829, and into other types of particulate, e.g., grain handling systems.

While preferred embodiments have been shown and described, various modifications and substitutions may be made thereto without departing from the spirit and scope of the invention. Accordingly, it is to be understood that the present invention has been described by way of illustration and not limitation.

I claim:

1. An air injector for an air lift system having a transport tube, the transport tube having a lower intake end, an upper discharge end, and an air injection section intermediate the intake and discharge ends, the air injector comprising:

air supply means for supplying a flow of compressed air;

housing means for housing the transport tube air injection section, said housing means being in fluid communication with said air supply means; and air jet means for converting said flow of compressed air into a jet of air, said air jet means being mounted in the transport tube air injection section, said air jet means comprising a first coil member having an outer surface and a substantially triangular-shaped cross section wherein said first coil member outer surface defines a base of a triangle thereof, said first coil member defining a coil-shaped slot, said slot having a substantially trapezoid-shaped cross section;

wherein said compressed air is delivered to said housing means by said air supply means for injection into the transport tube through said slot.

2. The air injector of claim 1 wherein said housing means comprises upper and lower portions, said housing means upper portion being disposed around the transport tube air injection section, said housing means lower portion comprising a second coil member having an outer surface and a substantially triangular-shaped cross section wherein said second coil member outer surface defines a base of a triangle thereof, said second coil member defining a coil-shaped slot, said slot of said second coil member having a substantially trapezoid-shaped cross section, said slot of said second coil member being in fluid communication with said air supply means, wherein said compressed air is delivered into said housing means through said slot of said second coil member by said air supply means for injection into the transport tube through said slot of said air jet means.

3. An air injector for an air lift system having a transport tube, the transport tube having a lower intake end, an upper discharge end, and an air injection section intermediate the intake and discharge ends, the air injector comprising:

air supply means for supplying a flow of compressed air;

housing means for housing the transport tube air injection section, said housing means being in fluid communication with said air supply means; and air jet means for converting said flow of compressed air into a jet of air, said air jet means being mounted in the transport tube air injection section, said air jet means comprising first means for defining at least one slot, said first means having an outer surface and a substantially triangular-shaped cross section wherein said outer surface defines a base of a triangle thereof whereby said slot has a substantially trapezoid-shaped cross section;

wherein said flow of compressed air is delivered to said housing means by said air supply means for injection into the transport tube through said slot.

4. The air injector of claim 3 wherein said housing means comprises upper and lower portions, said housing means upper portion being disposed around the transport tube air injection section, said housing means lower portion comprising second means for defining at least one slot, said slot of said housing means lower portion having a profile that opens inwards, said slot of said housing means lower portion being in fluid communication with said air supply means, wherein said compressed air is delivered into said housing means through said slot of said housing means lower portion by said air supply means for injection into the transport tube through said slot of said air jet means.

5. The air injector of claim 4 wherein said second means for defining said slot thereof has an outer surface and a substantially triangular-shaped cross section wherein said outer surface defines a base of a triangle thereof whereby said slot of said housing means lower portion has a substantially trapezoid-shaped cross section.

6. The air injector of claim 4 wherein said first means for defining said slot thereof and said second means for defining said slot thereof each comprise a plurality of ring members and mounting means for mounting said ring members in axially spaced relationship wherein said ring members define a plurality of ring-shaped slots.

7. The air injector of claim 4 wherein said first means for defining said slot thereof comprises a first coil member having an outer surface and a substantially triangular-shaped cross section and said second means for defining said slot thereof comprises a second coil member having an outer surface and a substantially triangular-shaped cross section wherein said outer surface of said first coil member and said outer surface of said second coil member each define a base of a triangle thereof, said first and second coil members defining first and second coil-shaped slots, said first and second slots each having a substantially trapezoid-shaped cross section.

8. The air injector of claim 3 wherein said housing means encloses said air jet means and wherein said air supply means comprises an air supply tube, said air supply tube penetrating said housing means.

9. The air injector of claim 3 wherein said first means for defining said slot thereof comprises a plurality of ring members and mounting means for mounting said ring members in axially spaced relationship wherein said ring members define a plurality of ring-shaped slots.

10. An air injector for an air lift system having a transport tube, the transport tube having a lower intake end, an upper discharge end, and an air injection section intermediate the intake and discharge ends, the air injector comprising:

air supply means for supplying a flow of compressed air;

housing means for housing the transport tube air injection section, said housing means being in fluid communication with said air supply means; and air jet means for converting said flow of compressed air into a jet of air, said air jet means being mounted in the transport tube air injection section, said air jet means comprising an interior and an exterior and means for defining a first coil-shaped slot, said first slot having a first width at said exterior and a second width at said interior wherein said second width is greater than said first width;

wherein said flow of compressed air is delivered to said housing means by said air supply means for injection into the transport tube through said first slot.

11. The air injector of claim 10 wherein said housing means comprises upper and lower portions, said housing means upper portion being disposed around the transport tube air injection section, said housing means lower portion comprising means for defining a second coil-shaped slot, said second slot having a profile that opens inwards, said second slot being in fluid communication with said air supply means, wherein said compressed air is delivered into said housing means through said second slot by said air supply means for injection into the transport tube through said slot of said air jet means.

* * * * *